United States Patent [19]
Ross

[11] 4,273,538
[45] Jun. 16, 1981

[54] EDUCATIONAL AID

[75] Inventor: Arnold S. Ross, London, England

[73] Assignee: Douglas Alan Ross, Geneva, Switzerland; a part interest

[21] Appl. No.: 71,158

[22] Filed: Aug. 30, 1979

[30] Foreign Application Priority Data

Sep. 6, 1978 [GB] United Kingdom ............... 35815/78

[51] Int. Cl.³ ..................... G09B 17/00; G11B 5/80
[52] U.S. Cl. .................................. 434/178; 434/312; 434/313; 434/317; 360/2
[58] Field of Search ............ 35/35 C, 8 A; 274/42 P; 360/2

[56] References Cited

U.S. PATENT DOCUMENTS

| 2,548,011 | 4/1951 | Frost | 35/35 C |
|---|---|---|---|
| 2,936,342 | 5/1960 | Kallmann | 35/35 C X |
| 2,945,307 | 7/1960 | Kallmann | 35/35 C |
| 3,280,481 | 10/1966 | Ryan | 35/35 C |
| 3,289,326 | 12/1966 | Bender | 35/35 C |
| 3,372,242 | 3/1968 | Garrett | 35/35 C X |
| 3,396,478 | 8/1968 | Genin | 35/35 C |
| 3,416,241 | 12/1968 | Weitzner | 35/35 C |
| 3,782,005 | 1/1974 | Oliveti | 35/35 C X |

Primary Examiner—William H. Grieb
Attorney, Agent, or Firm—Pollock, Vande Sande & Priddy

[57] ABSTRACT

Apparatus for teaching reading comprises a book having lines of printed text and recordings of the text on associated magnetic strips and a pick-up member of sufficient weight to rest securely on the magnetic strips is provided with a tension member by which the pick-up member may be drawn manually or by a spring motor along the magnetic strips. The pick-up member may be shaped in a manner designed to appeal to the imagination of a user, for example as an animal.

2 Claims, 2 Drawing Figures

EDUCATIONAL AID

FIELD OF THE INVENTION

This invention is concerned with educational aids and particularly with devices to assist a person to read.

BACKGROUND OF THE INVENTION

One way of teaching a person to read is to associate a printed text with the spoken word and there have been many proposals to allow the learner to do this without a teacher by associating a printed text with a recording thereof and providing means for reproducing the recording. Many of these proposals have involved the use of single sheets or cards carrying the printed text and most have required complicated and expensive apparatus for reproducing the record of sound.

It has also been proposed to provide a manually-held pick-up device in the form of a wand passed along the magnetic strip to reproduce the sounds corresponding to the words on an associated line of printed text.

Until a certain amount of skill is obtained by practice, difficulty is experienced when the pick-up device is held in the hand in maintaining an even speed along the tape and a correct even pressure on the tape, both of which are necessary for good reproduction. Particularly with small children these initial difficulties are likely to discourage the user so that the device is discarded. Furthermore, the shape of a wand to be held in the hand is restricted so that it is difficult to vary its appearance so as to enhance the appeal of the device as a toy as well as an educational device. The efficiency of educational aids is greatly enhanced if the aid is presented as a toy or in an amusing or appealing manner.

An object of this invention is to provide an aid to the teaching of reading in which these difficulties are eliminated or greatly reduced.

PRIOR ART

The most relevant prior art known to the applicant comprises U.S. Pat. Nos. 2,548,011, 2,945,307, 3,280,481, 3,396,478 and 3,416,241.

SUMMARY OF THE INVENTION

From one aspect, the invention provides apparatus for teaching reading comprising a book with a plurality of sheets containing lines of text and an associated recording of said text on magnetic strips, and a device including a pick-up adapted to rest under its own weight on any one of said magnetic strips and to be drawn along said strip by tension means attached to said device.

From another aspect, apparatus for teaching reading according to the invention comprises a book with a plurality of sheets containing lines of text and magnetic strips each associated with a line of text and bearing a sound record of the text in that line, a transparent sheet having guide slots adapted to overlay said sheets with the slots exposing said magnetic strips, and means for reproducing said sound record comprising a member containing a pick-up and having a flat base adapted to rest under its own weight on said magnetic strip in said guide slot and to be drawn along said guide slot by an attached tension means.

As the member containing the pick-up rests on the strip and is not held in the hand, the positioning of the pick-up head and the pressure exerted on the tape remain constant while the member is drawn along the tape. It is also found that it is much easier to maintain an even speed when the pick-up member is drawn along by a string or cable than if it is held in the hand.

Apart from the requirement that the pick-up member should be a flat base so that it can rest snugly on the magnetic strip and preferably has two parallel straight sides so that it can engage in a guide slot in a transparent overlay, there is little or no restriction on its shape. It can therefore be designed so as to appeal to a young child and thereby encourage the use of the device. For example, the pick-up member may comprise a substantially rectangular base having a flat undersurface on which base is mounted a figure pointing to the printed text, or an animal or animal's head apparently reading the printed text.

The pick-up member may include the necessary sound reproducing apparatus such as amplifiers, batteries and loudspeaker as well as the pick-up head. The tension member may then comprise a string or other flexible element attached to the base.

Alternatively, some or all of the sound reproducing apparatus other than the pick-up head may be housed separately and connected to the pick-up member by an electric cable which can then be used to draw the pick-up member along the magnetic strips. The sound reproducing apparatus may be housed in an appropriately designed housing, as for example a kennel for a dog mounted on the pick-up member.

Guide slots in a transparent sheet attached to the book and adapted to overlay the magnetic strips may each be of greater width at the left hand end and lead gradually into the major portion of the slot. The pick-up member may be placed in the widened part of the slot so that as it is drawn along the slot it automatically locates itself in the correct position relatively thereto.

The base of the sensitive area of the magnetic pick-up preferably covers the full width of the magnetic strip so that it is not essential, when the user passes the pick-up member along the strip, for it to be in exactly correct alignment. So long as some section of the sensitive contact at the base of the pick-up member is in position over any section of the magnetic strip the sound will be satisfactorily reproduced. There is thus a considerable amount of latitude as to how straight the user passes the pick-up over the strip.

According to another feature of the invention, the pick-up member may be drawn along the magnetic strip by a clockwork motor energized by withdrawing the tension member to place the pick-up member at the beginning of a magnetic strip. A geared clockwork-type spring housed for example in the housing of the sound reproducing apparatus is connected by a tension member, for example the electric cable, to the pick-up member. The housing is placed in alignment with the magnetic strip at the right hand side and the pick-up member is pulled out to wind up the spring. The pick-up member is placed in the correct position in the widened end of the slot and released. As the spring unwinds, the tension member will be retracted into the housing, pulling the pick-up along the magnetic strip at an even and correct speed. The gearing of the clockwork spring is such as to move the pick-up along the strip at the same speed as that at which the recorded words were imposed on the strip.

Until the operator has acquired the ability to pull the pick-up member by hand, the spring ensures that the pick-up gives satisfactory reproduction of the recorded words.

Once the operator has got the idea as to the correct speed at which the pick-up member should be moved, the use of the spring motor may be discontinued and the operator can pull the pick-up member manually along the strip, thereby becoming more fully involved. Means may be provided to lock the spring with the tension members in the fully extended position or to allow the tension member to be disconnected from the clockwork motor.

DESCRIPTION OF PREFERRED EMBODIMENTS

Figure 1:
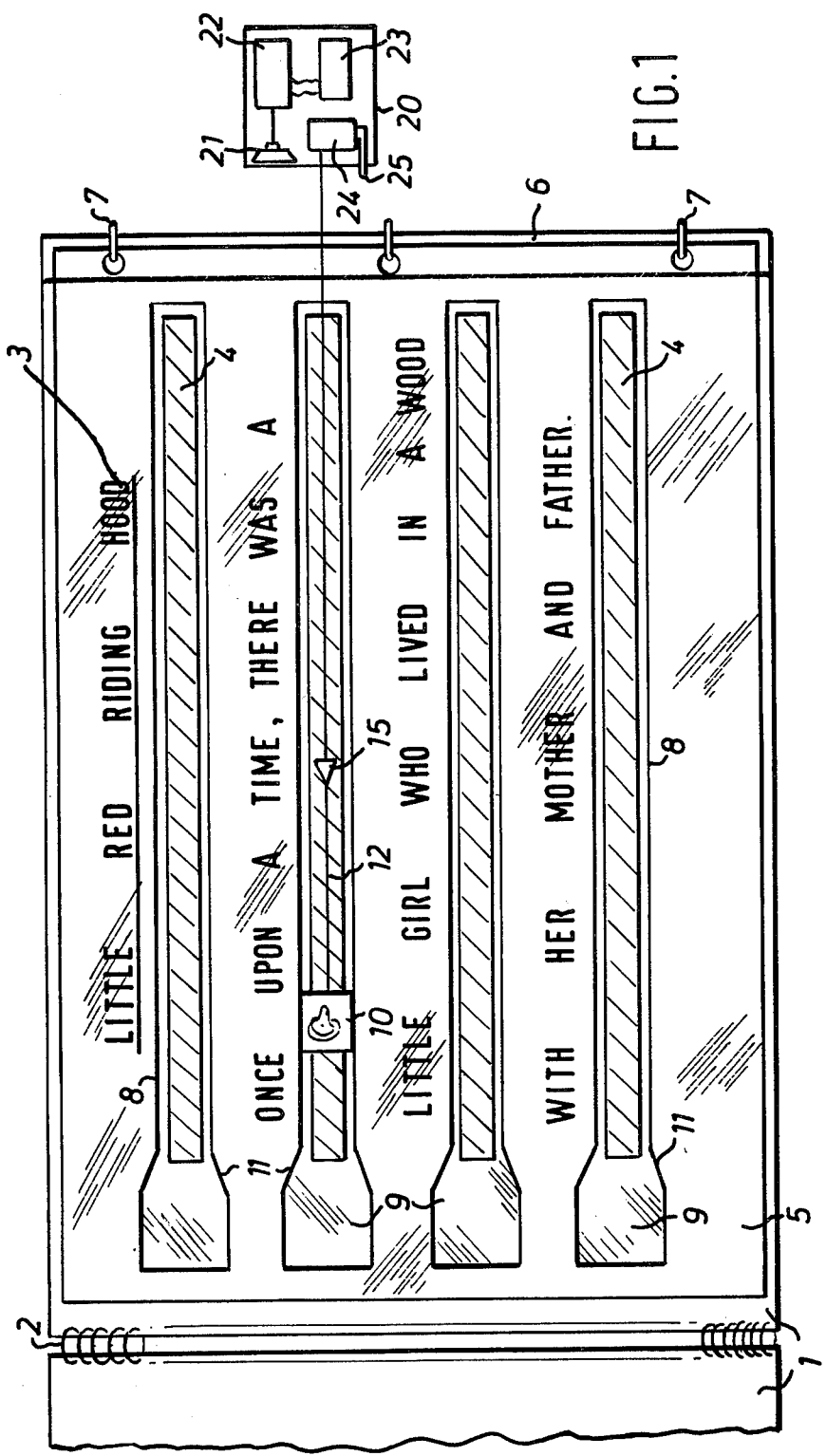
FIG. 1 is a plan view of an educational aid according to the invention.
Figure 2:
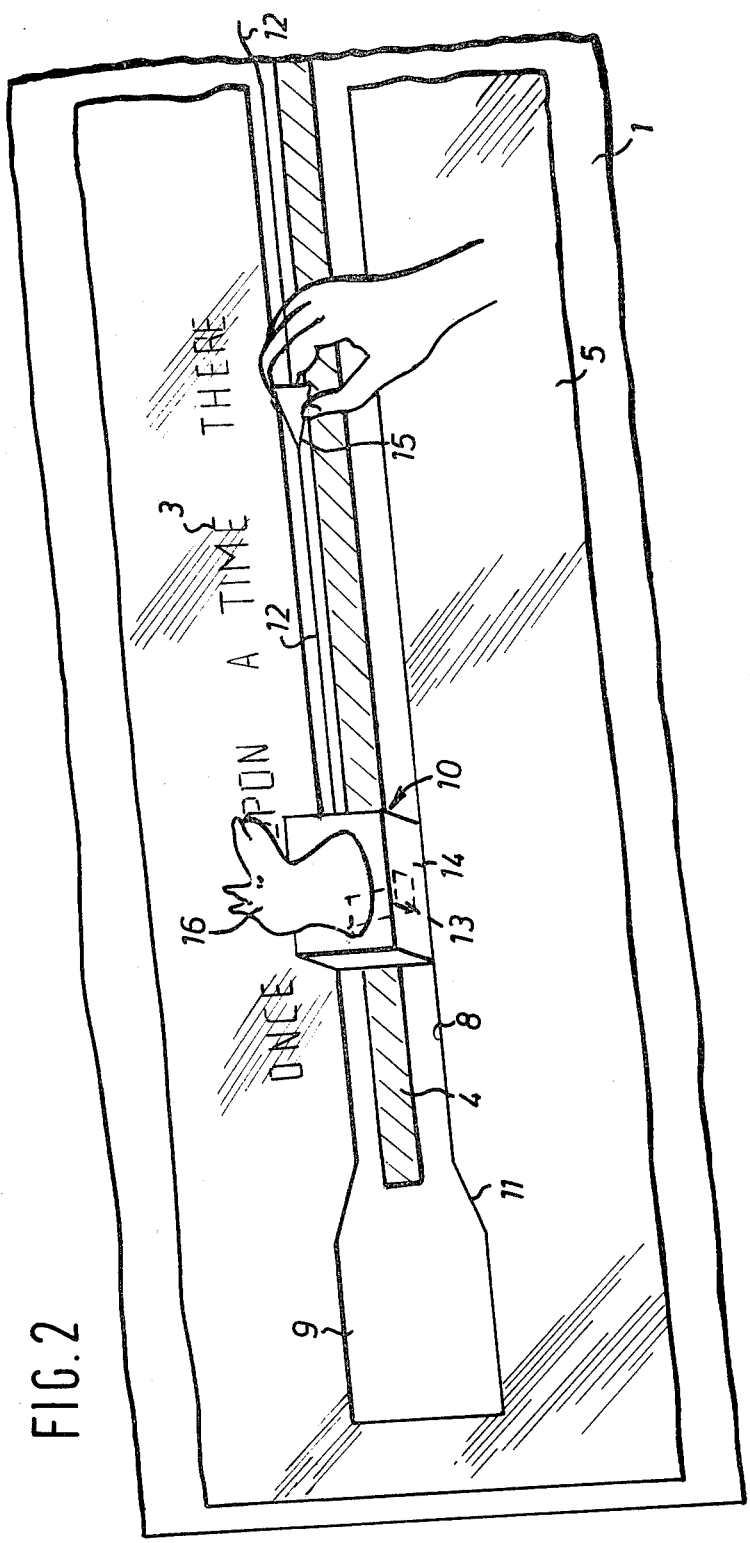
FIG. 2 is a perspective view on a larger scale of a part of FIG. 1.

As shown in the drawings, a plurality of sheets 1 are bound together in book form by means such as a spiral binding 2 which permits the book to be opened flat. Each sheet is printed with spaced lines of text 3 and interposed between these lines are magnetic strips 4 on which is prerecorded a sound record of the printed text. The strips are so arranged relatively to the printed text that the sound record of each word is adjacent that word in the printed text.

A transparent plastics overlay 5 is attached to the back cover 6 of the assembled sheets by ring binders 7 or the like which allow the overlay 5 to be laid over each sheet 1 as required. This overlay 5 is formed with a number of guide slots 8 corresponding to the magnetic strip 4. The slots 8 are a little wider than the strip 4 so that a pick-up device 10 can be placed in the slots and guided by them along the strips 4. The pick-up device 10 has two parallel straight faces which contact the sides of the slots. Each slot 8 at its left hand end has a wider portion 9 merging into the major portion of the slots by inclined portions 11 so that the pick-up device can be placed in the portion 9 and guided into the main slot by the inclined portion 11.

The base 14 of the pick-up device 10 is flat underneath so that it can rest firmly on the sheet 1. The pick-up head 13 is exposed in the bottom of the base and spans the magnetic strip 4 so that slight variations in its transverse relation with the strip 4 do not adversely affect the sound reproduction.

A sound reproducing device comprising a loudspeaker 21, amplifier 22 and batteries 23 may be housed in the pick-up device or in a separate housing 20 connected by an electric cable to the pick-up device.

Attached to the pick-up device 10 is a flexible tension member 12, such as a string or the electric cable connecting it to the sound reproducer. A finger grip 15 by which the operator can pull the pick-up along the magnetic strip is secured to the tension member 12 at a distance from the pick-up device such as to obviate the risk of the operator lifting the pick-up off the magnetic strip if he does not hold his hand parallel with the surface of the sheet as he pulls the pick-up device along. For the same reason, the pick-up device 10 is of sufficient weight to ensure that it makes and maintains good contact with the magnetic strip.

The appeal of the apparatus to a child, necessary to maintain interest, is enhanced by mounting on the base 14 of the pick-up device an appropriate FIG. 16, such as a dog's head, which may be oriented so as to suggest that the dog is reading the text. The housing 20 may be of a shape appropriate to the FIG. 16, as for example simulating a dog's kennel.

In a modified form, shown in FIG. 1, the pick-up device 10 is drawn along the magnetic strip 4 by a clockwork motor 24 which may conveniently be included in the housing 20. This motor 24 comprises a spring which is connected to the tension member 12 and is wound by withdrawing the tension member 12. In use, the housing 20 with the motor 24 is placed at the right hand side of the book in alignment with the magnetic strip 4 to be read. The pick-up device 10 is moved to the left hand side, winding up the motor, and placed in the enlarged portion 9 of the slot. On release of the pick-up device, the spring of the motor unwinds and draws the pick-up device at an appropriate even speed along the magnetic strip.

Means operated by a lever 25 may be provided to lock the tension member 12 in the fully extended position and allow the user to pull the pick-up device manually along the magnetic strip, once he has got the idea as to the correct speed at which the pick-up device should be moved. The user is then much more involved so that interest in the device is maintained. Similarly, when the user has acquired sufficient skill, the overlay 5 may be folded back and the pick-up device 10 moved without the help of the guide slots 8.

It will be understood that the invention is not restricted to the details of the preferred forms described by way of example, which may be modified without departure from the scope of the accompanying claims.

I claim:

1. Apparatus for teaching reading comprising a book having a plurality of first sheets bearing spaced lines of printed text, a plurality of magnetic strips associated respectively with said lines of printed text and each bearing a sound recording of the associated text so positioned that the second record of each word is adjacent that word in the printed text, a second transparent sheet in said book adapted to overlay each of said first sheets in succession, guide slots in said transparent sheet for exposing the magnetic strips on a selected one of said first sheets, means for reproducing said sound records comprising a pick-up device having a flat base and adapted to rest under its own weight on said magnetic strip in a guide slot without obscuring the associated printed text, and means attached to said device for drawing said pick-up device along said guide slot to reproduce the sound recording on the magnetic strip adjacent said guide slot simultaneous with the user's reading of the printed text associated with said magnetic strip.

2. Apparatus for teaching reading comprising a book, a plurality of sheets included in said book, said sheets bearing spaced lines of text, a magnetic strip associated with each of said lines of text and bearing a recording of the associated text, a transparent sheet adapted to overlay said sheets, guide slots in said transparent sheet exposing said magnetic strips, means for reproducing said sound record comprising a device including a pick-up head and having a flat base, said device being adapted to rest under its own weight on said magnetic strip in a guide slot, and tension means attached to said device to draw said device along said guide slot, said guide slots having widened portions at one end thereof connected to the main portions of the slots by inclined portions to guide said device from said widened portions into the main portions of the slots.

* * * * *